United States Patent [19]
Dodson et al.

[11] Patent Number: 6,091,735
[45] Date of Patent: Jul. 18, 2000

[54] BROADBAND CIRCUIT IDENTIFICATION METHOD FOR CONTROLLING SERVICE ACCESS

[75] Inventors: Patricia A. Dodson; Gerald Baker, both of Vancouver, Wash.; Donald L. Brodigan, Westminster, Colo.

[73] Assignee: US West, Inc., Denver, Colo.

[21] Appl. No.: 09/201,512

[22] Filed: Nov. 30, 1998

[51] Int. Cl.[7] .................................................. H04L 12/28
[52] U.S. Cl. ............................................. 370/420; 370/463
[58] Field of Search .................................... 370/522, 397, 370/399, 409, 410, 420, 463; 348/7, 13, 16; 379/201; 570/401

[56] References Cited

U.S. PATENT DOCUMENTS

| | | | |
|---|---|---|---|
| 5,650,994 | 7/1997 | Daley ....................................... | 370/259 |
| 5,790,173 | 8/1998 | Strauss et al. ............................. | 348/8 |
| 5,790,548 | 8/1998 | Sistanizadeh et al. .................... | 370/401 |
| 5,881,131 | 3/1999 | Farris et al. .............................. | 379/201 |
| 5,978,855 | 11/1999 | Metz et al. ................................ | 709/249 |

*Primary Examiner*—Huy D. Vu
*Attorney, Agent, or Firm*—Brooks & Kushman, P.C.

[57] ABSTRACT

A method for controlling customers' access to services on a broadband network. The method uses a circuit identifier, unique to each customer, to compare service requests with service entitlements. The network provider flows the circuit identifiers to the service providers where relationship between the circuit identifiers and the service entitlements is established in service orders. Service providers flow the service orders back to the broadband network though a standard business system interface. The relationship between the circuit identifiers and the service requests is accomplished at the Broadband Digital Terminal that interface the customers to the broadband network. The circuit identifiers also permit sorting of data bases containing logs of service requests and logs of maintenance actions.

11 Claims, 2 Drawing Sheets

BROADBAND CIRCUIT IDENTIFICATION METHOD FOR CONTROLLING SERVICE ACCESS

TECHNICAL FIELD

This invention relates to the field of controlling access to services on a broadband network in which a circuit identifier, unique to each port, is used when verifying requests for the services against allowed service entitlements.

BACKGROUND ART

Presently, many home owners and businesses contract with multiple service providers for the telephone, video and data services they need. Having several different types of interfaces to the various classes of services is common. For example, a business may have one set of phone lines for telephone services, a coax interface for video services, and a wide area network interface for data services. The emergence of broadband networks is changing this situation by allowing all of the classes of services to be available to the customers through a single broadband network interface.

The bundling of services on the broadband networks has created a challenge to match delivery of services with the customers' entitlements. Historically, different service providers have used different methods to control customer access to services. For example, cable companies provide video services by sending the entire suite of channels to all of the customers all of the time. The customer then receives only those channels that they have paid for by means of special equipment at the customers location that filters out the non-contracted channels. A cable company changes the channel entitlement by either replacing or reprogramming the equipment at the customer's site. Data service companies control customer access to services at their end of the interface. The customers link their computers to the service provider's computers typically using a cable modem. Without changing the cable modem, the service provider can alter the services the customer may access by issuing new instructions to its own computers. Since the service providers control the interfaces to the customers, they can control the access to the services any way they want.

Inserting a broadband network between the service providers and the customers shifts the burden of controlling customer access to the services on the broadband network. For example, customers who wish to activate a new video service must contact their video service provider of choice to establish the entitlements. The service provider then makes the new video service available to the broadband network along with a circuit identification of the customers who are entitled to receive it. The broadband network then routes the new video service only to those network ports that interface to the entitled customers. This approach requires the broadband network manager to understand which ports are entitled to which services and control them from the network side accordingly. However, no standard mechanism is currently in place that allows the service providers to inform the network manager which ports are entitled to which services.

DISCLOSURE OF INVENTION

The present invention is a method for controlling customer access to services on a broadband network. The method uses a circuit identifier, unique to each port, to compare service requests with service entitlements. The network provider flows the circuit identifiers to the service providers where relationship between the circuit identifiers and the service entitlements is established in service orders. Service providers flow the service orders back to the broadband network though a standard business system interface. The relationship between the circuit identifiers and the service requests is accomplished at the Broadband Digital Terminal that interfaces the customers to the broadband network. The circuit identifiers also permit sorting of data bases containing logs of service requests and logs of maintenance actions.

Accordingly it is an object of the present invention to provide a method of controlling customer access to services on a broadband network.

Another object of the present invention of is to provide for multiple circuit identifiers to facilitate service access control, where each of the multiple circuit identifiers is unique to one port on one remote node.

Another object of the present invention is to provide a method for flowing the circuit identifiers to the service providers where entitlements are attached and flowed back into the broadband network.

Another object of the present invention is to attach a port number and a remote node number to each service request at the port with which the customer interfaces.

These and other objects will become more apparent from a reading of the detailed specification in conjunction with the drawings.

BEST MODE FOR CARRYING OUT THE INVENTION

Figure 1:
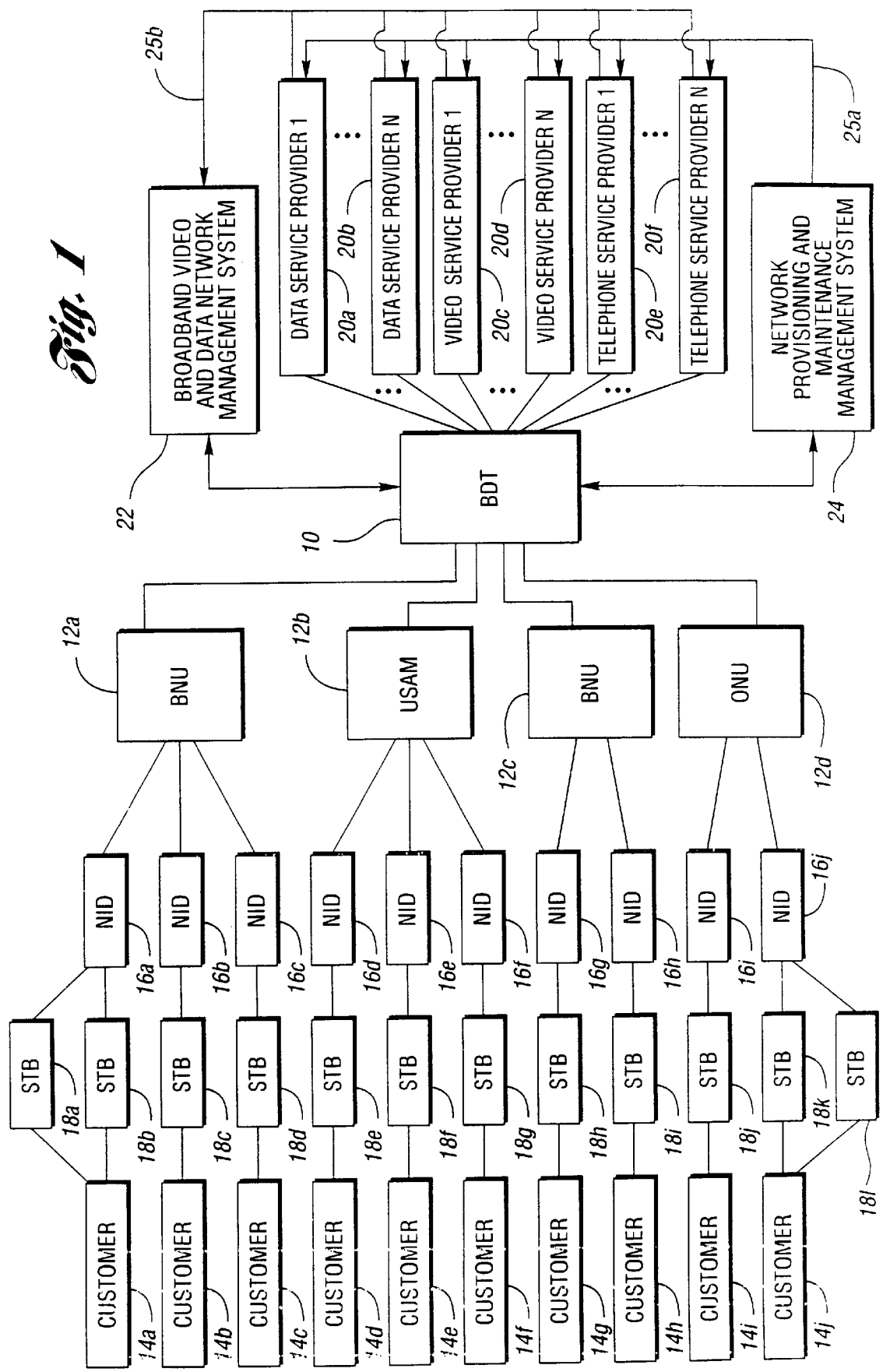
FIG. 1 is a schematic of a typical broadband network with multiple customers and multiple service providers.

FIG. 1 shows the layout of a typical broadband network that implements the method of the present invention. A network provider houses a central node, such as a Broadband Digital Terminal (BDT) 10, in a central office. The BDT is responsible for controlling the broadband network. Fiber optics branch out from the BDT to remote nodes 12a–12d located near the customers. The remote nodes 12a–12d can be any combination of several variety of boxes, including a Broadband Network Unit (BNU), a Universal Service Access Multiplexer (USAM), and an Optical Network Unit (ONU). Each remote node 12a–12d provide a bridge between the optical domain of the broadband network and the electrical domain of the customers 14a–14j. Each remote node 12a–12d has several ports, at least one port for each customer 14a–14j. The ports are connected to Network Interface Devices' (NID) 16a–16e which are located on the outside of the customers building. Each NID 16a–16e is connected to a Set-Top Box (STB) 18a–18l. The STBs 18a–18l encodes and decodes the various services sent and received respectively from the port.

A variety of service providers 20a–20f interface to the broadband network through the BDT 10. Service providers 20a–20f can include multiple data services, multiple video services, multiple telephone services, and any other service that can be digitized for transportation over the broadband network. The telephone services may include access to an existing regional Bell operating company's legacy system, access to other exchange carriers, and to inter-exchange carriers. A broadband video and data network management system software package 22 manages the services provided throughout the broadband network. The service providers 20a–20f communicate with the broadband video and data network management system software 22 through a standard business system interface 25b. (E.g., the General Instrument Addressable Controller System ACC4000D protocol.). Finally, a network provisioning and maintenance management system software package 24 manages the physical aspects of the broadband network. This network provisioning and maintenance management system software package 24 is responsible for detecting when the various ports of the remote nodes 12a–12d are enabled and ready to communicate with the customers 14a–14j. The service providers 20a–20f also communicate with the network provisioning and maintenance management system software package 24 through a standard business system interface 25a.

Figure 2:
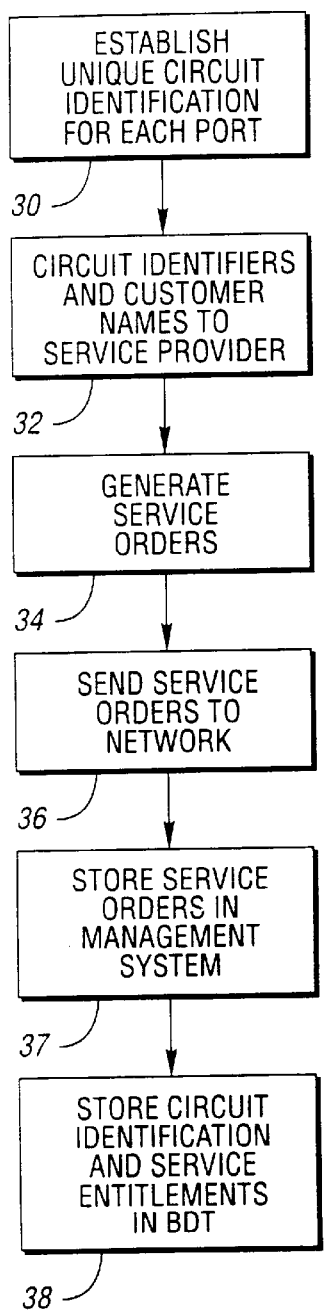
FIG. 2 is a flow diagram of the sequence of events that establish the relationship between the customer and the customer service entitlements.

FIG. 2 is a flow diagram showing how the relationship between the customer and the customer service entitlements is established. The process starts after a customer is connected to a port at a remote node and the network provisioning and maintenance management system software package detects that a port has been enabled. The network provider first establishes a unique circuit identification for each port 30. Since there is one or more ports per customer, the circuit identification is unique to each port. The network provider then sends the circuit identifications and customer names to the service providers 32. Meanwhile, the customers interface directly with the service providers to establish entitlements for the different services being offered. Where a service provider has agreed to entitlements for a particular customer, and has the circuit identification from the network provider that is unique to that particular port, a service order is generated 34. Service orders contain fields for the service to be provided, and a field for a unit address. Service providers enter the entitlements in the services to be provided fields, and the circuit identification in the unit address field. The service providers then return the service orders to the network provider 36 using the business system interface to the broadband video and data network management system software. The broadband video and data network management system software stores the service orders 37 and flows the service orders through to the BDT where the circuit identifications and service entitlements are stored 38. At this point, the BDT knows which entitlements are linked to which circuit identifications, and which circuit identification is linked to which port.

To make the circuit identification useful to a variety of network providers and a variety of service providers, the circuit identification should have a standardized format. In the preferred embodiment the circuit identification is a seventeen octet message. The first two octets contain the state code identifying the state from which the circuit identification terminates. The next four octets contain a common language circuit identifier (CLCI). Preferably the CLCI is the same as the circuit identifier currently in use by all of the regional Bell operating companies, although another standard may be employed within the scope of the present invention. The next six octets contain codes for the central node, remote node number and port number. This information identifies the physical location of the port within the network. The next three octets contain a code identifying the serving wire center. In the last two octets are a company code that identifies the owner of the port equipment. The company code field may be truncated if necessary to flow the circuit identification through other automated systems that can only handle limited field lengths.

Figure 3:
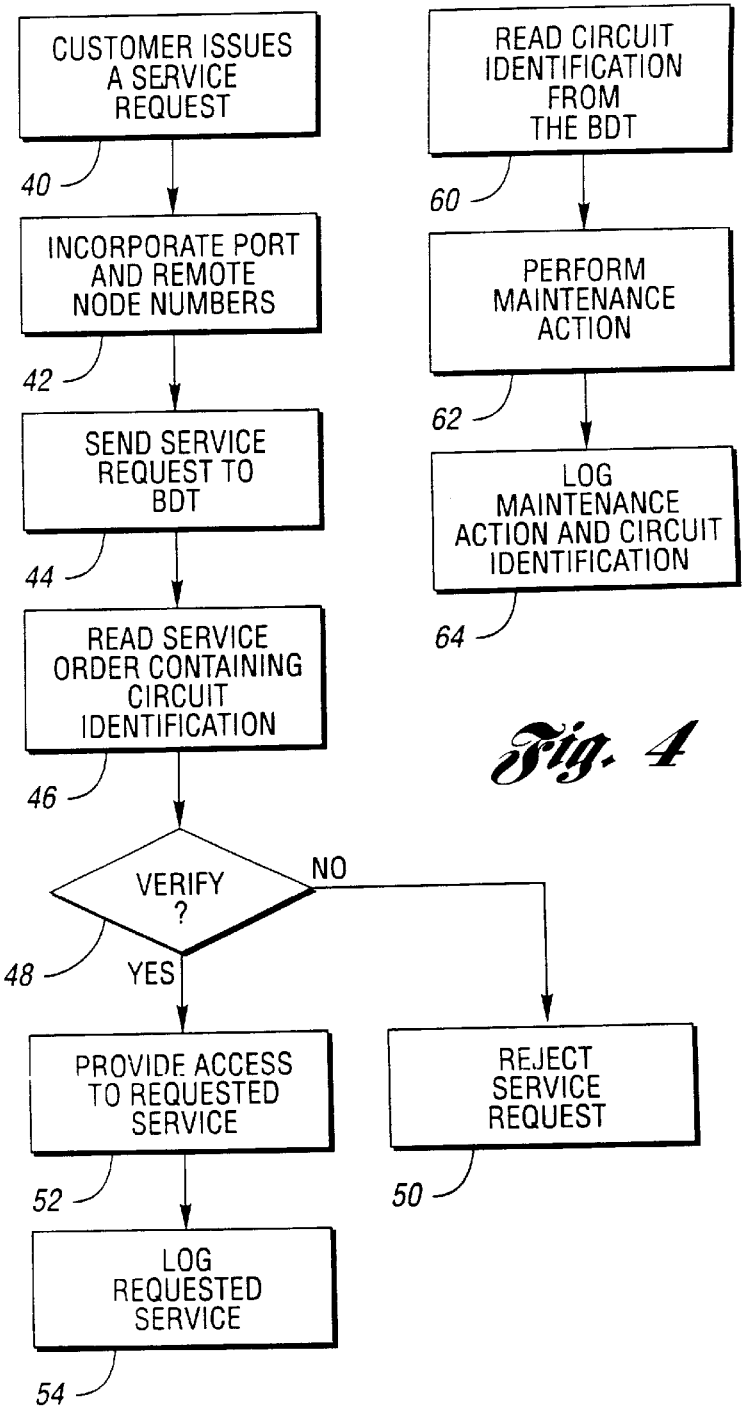
FIG. 3 is a flow diagram of the sequence of events that log and verify service requests against the service entitlements.

FIG. 3 shows the sequence of events that take place when a customer issues a service request 40. The remote node that the customer is connected with incorporates the port number and remote node number into the service request 42 then sends the service request to the BDT 44. When the service request is received by the BDT, the BDT reads from memory the stored service entitlements which contain the same port number and remote node number as in the service request 46. The BDT then verifies, decision block 48, that the customer's service request matches the customer's service entitlements. If there is no match between the service request and the entitlements, then the service request is rejected 50. If the service request matches one of the customer's service entitlements, then the BDT provides access to the corresponding service 52. Once the BDT has received and verified a valid service request, the BDT may log the service request in a service request history data base 54. This service request history data base may be sorted by the circuit identifications within the service requests to support billing.

Figure 4:
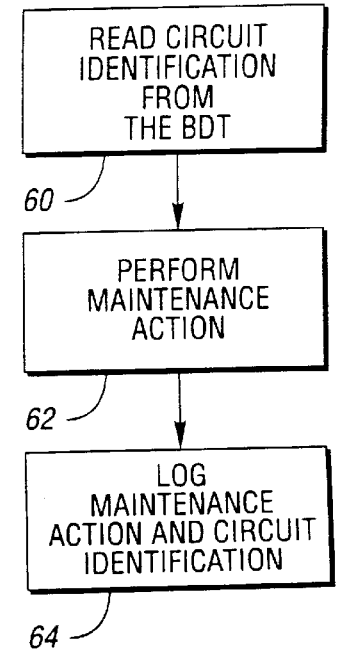
FIG. 4 is a flow diagram of the sequence of events used to support maintenance actions.

FIG. 4 is a flow diagram showing how the circuit identification may support maintenance of the broadband network. As part of a maintenance action, repair personnel read the circuit identification from the BDT 60. From the circuit identification the repair personnel can learn about the physical location and characteristics about the port. The maintenance action is then performed 62. When finished, the repair personnel log the maintenance action and associated circuit identification into a maintenance history data base 64. The circuit identification permits the maintenance history data base to be sorted by port, remote node, or central node.

Users of the present invention derive additional benefits from the circuit identification method. In particular, use of a unique standard circuit identifier facilitates the automated use of a Jerrold protocol in providing the video and data services over the broadband network. The regional Bell operating companies may use the circuit identification in their existing reporting systems to record voice switching between their legacy telephone system and the broadband network. The circuit identification provides equipment designers a method to incorporate equipment characteristic intelligence in the common language circuit identifier field to aid provisioning and maintenance. Finally, the circuit identification gives the network providers a method to inventory the ports.

While embodiments of the invention have been illustrated and described, it is not intended that these embodiments illustrate and describe all possible forms of the invention. Rather, the words used in the specification are words of description rather than limitation, and that various changes may be made without departing from the spirit and scope of the invention.

What is claimed is:

1. A method for controlling access to a plurality of services by a plurality of ports on a plurality of remote nodes in a network, wherein the plurality of services are provided by at least one service provider, the method comprises:

establishing a plurality of circuit identifications, one circuit identification is established for each port of the plurality of ports, wherein each circuit identification has at least a port number and a remote node number;

generating at least one service order for each port, each service order having the circuit identification of the respective port and at least one service entitlement;

providing the circuit identification and a customer name respectively to the at least one service provider;

generating a plurality of service orders, at least one service order for each circuit identification received by the at least one service provider, each service order having the respective circuit identification and at least one service entitlement;

sending each service order to the network;

storing each sent service order in a management system;

storing each circuit identification and each service entitlement in a central node;

providing at least one service request to a respective one port of the plurality of ports;

attaching to each service request the port number of the respective port and the remote node number of the respective remote node;

sending each service request to the central node after the port number and remote node number have been attached;

verifying for each service request that the circuit identification of at least one service entitlement has the same port number and remote node number as in the service request, in response to the service request being received at the central node; and providing the respective port access to one service of the plurality of services in response to the verified service request.

2. The method of claim 1 wherein the network is a Very-High-Data-Rate Digital Subscriber Line broadband network.

3. The method of claim 1 wherein the circuit identification further includes a state code, a circuit type identifier, a central node code, a serving wire center code, and a company code.

4. The method of claim 1 wherein the network interfaces to at least one video service provider, and the plurality of services includes at least one video service.

5. The method of claim 1 wherein the network interfaces to at least one data service provider, and the plurality of services includes at least one data service.

6. The method of claim 1 wherein the network interfaces to at least one telephone service provider, and the plurality of services includes at least one telephone service.

7. The method of claim 1 wherein the network interfaces to at least one existing telephone system, and the plurality of services includes at least one telephone service.

8. The method of claim 1 further comprises logging each verified service request in a service request history data base.

9. The method of claim 8 wherein the service request history data base can be sorted by the circuit identification in each service request.

10. The method of claim 3 further comprising:

reading each circuit identification stored in the central node, for supporting a plurality of maintenance actions on each port associated with each circuit identification; and logging each maintenance action and the circuit identification associated with each port receiving each maintenance action in a maintenance history data base in response to completing each maintenance action.

11. The method of claim 10 wherein the maintenance history data base can be sorted by each circuit identification.

* * * * *